(12) United States Patent
Rowe et al.

(10) Patent No.: US 12,169,294 B2
(45) Date of Patent: Dec. 17, 2024

(54) LIDAR REFLECTIVE FABRIC

(71) Applicant: Toyota Motor Engineering & Manufacturing North America, Inc., Plano, TX (US)

(72) Inventors: Michael P. Rowe, Pinckney, MI (US); Songtao Wu, Ann Arbor, MI (US); Debasish Banerjee, Ann Arbor, MI (US); Charles R. Rutledge, Tipton, MI (US); Torin C. Peck, Owosso, MI (US); Michael Jones, Orchard Lake, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/136,084

(22) Filed: Apr. 18, 2023

(65) Prior Publication Data
US 2023/0400610 A1 Dec. 14, 2023

Related U.S. Application Data

(63) Continuation of application No. 17/835,358, filed on Jun. 8, 2022, now Pat. No. 11,656,388.

(51) Int. Cl.
*G02B 5/08* (2006.01)
*D06M 11/42* (2006.01)

(52) U.S. Cl.
CPC ............... *G02B 5/08* (2013.01); *D06M 11/42* (2013.01); *D06M 2200/25* (2013.01)

(58) Field of Classification Search
None
See application file for complete search history.

(56) References Cited

U.S. PATENT DOCUMENTS

| 8,842,015 | B2 | 9/2014 | Scott |
| 9,163,129 | B2 | 10/2015 | Kobayashi |
| 9,921,297 | B2 | 3/2018 | Jungwirth |
| 11,118,062 | B2 | 9/2021 | Banerjee et al. |

(Continued)

FOREIGN PATENT DOCUMENTS

| CA | 3076573 A1 * | 6/2012 | ............ A47H 23/10 |
| CN | 109270963 A | 1/2019 | |

(Continued)

OTHER PUBLICATIONS

Wong, Angela, et al. "Application of rutile and anatase onto cotton fabric and their effect on the NIR reflection/surface temperature of the fabric." Solar Energy Materials and Solar Cells 134 (2015): 425-437. (Year: 2015).*

(Continued)

*Primary Examiner* — Robert S Loewe
(74) *Attorney, Agent, or Firm* — Dinsmore & Shohl LLP (57) ABSTRACT

A composite material having a black pigment and a textile material. The composite material has a reflectivity toward near infrared electromagnetic radiation having a wavelength from 800 nm to 2500 nm of greater than or equal to 12%, and the composite material has a reflectivity toward visible light having a wavelength from 350 nm to 750 nm of less than or equal to 10%.

19 Claims, 4 Drawing Sheets

(56) References Cited

U.S. PATENT DOCUMENTS

| | | | |
|---|---|---|---|
| 11,656,388 B1* | 5/2023 | Rowe | D06M 11/42 428/221 |
| 2002/0030742 A1 | 3/2002 | Aman et al. | |
| 2004/0018360 A1* | 1/2004 | Hugo | C09D 5/00 428/480 |
| 2005/0152828 A1* | 7/2005 | Aga | G03G 9/0902 423/594.2 |
| 2008/0134941 A1 | 6/2008 | Sanada | |
| 2011/0247524 A1 | 10/2011 | Sanada | |
| 2016/0215145 A1 | 7/2016 | Maruyama et al. | |
| 2020/0349338 A1 | 11/2020 | Lagmanson | |
| 2021/0054533 A1 | 2/2021 | Liao et al. | |

FOREIGN PATENT DOCUMENTS

| | | | | |
|---|---|---|---|---|
| EP | 1127926 A1 * | 8/2001 | | C09D 5/00 |
| JP | 2016017242 A * | 2/2016 | | D06P 1/36 |
| KR | 1020210105982 A | 8/2021 | | |
| WO | 2020021306 A1 | 1/2020 | | |
| WO | 2021074360 A1 | 4/2021 | | |
| WO | WO-2022107720 A1 * | 5/2022 | | B32B 27/12 |

OTHER PUBLICATIONS

Zhang, Jing, et al. "Preparation of colorful, infrared-reflective, and superhydrophobic polymer films with obvious resistance to dust deposition." ACS applied materials & interfaces 10.46 (2018): 40219-40227. (Year: 2018).*

You, Zhilang, et al. "A black near-infrared reflective coating based on nano-technology." Energy and Buildings 205 (2019): 109523. (Year: 2019).*

Machine translation of WO-2022107720, translation generated Oct. 2023, 11 pages. (Year: 2023).*

Machine translation of JP-2016017242-A, translation generated Mar. 2024, 10 pages. (Year: 2024).*

"What is the Working Principle of Reflective Fabric?" Hangzhou Chinastars, https://www.chinareflective.com/faqs/How_does_reflective_fabric_work.html.

"Reflective Strips", Spacio Innovations, https://www.spacioinnovations.com/brilliant.html.

Rezaie et al. "Photo and biocatalytic activities along with UV protection properties on polyester fabric through green in-situ synthesis of cauliflower-like CuO nanoparticles." Journal of Photochemistry and Photobiology B: Biology 176 (2017): 100-111. (Year: 2017).

Kim et al. "Black textile with bottom metallized surface having enhanced radiative cooling under solar irradiation." Nano Energy 82 (2021): 105715. (Year: 2021).

Kafafy et al. "Treatment of cotton and wool fabrics with different nanoparticles for multifunctional properties." Egyptian Journal of Chemistry 64.9 (2021): 1-2. (Year: 2021).

Soumya et al. "Silanated nano ZnO hybrid embedded PMMA polymer coatings on cotton fabrics for near-IR reflective, antifungal cool-textiles." New Journal of Chemistry 40.8 (2016): 7210-7221. (Year: 2016).

Wu et al. "Pitch-Black Nanostructured Copper Oxide as an Alternative to Carbon Black for Autonomous Environments." Advanced Intelligent Systems 3.9 (2021): 2100049. (Year: 2021).

Lv, Jian, et al. "Robust, infrared-reflective, superhydrophobic and breathable coatings on polyester fabrics." Progress in Organic Coatings 147 (2020): 105786. (Year: 2020).

Krauss et al. "Black—The Fine Details" European Coatings, Journal, May 2019, 7 pages. (Year: 2019).

International Search Report for Application No. PCT/US2023/024665 dated Jun. 7, 2023 (11 pages).

* cited by examiner

LIDAR REFLECTIVE FABRIC

CROSS-REFERENCE TO RELATED APPLICATION

This application is a continuation of U.S. application Ser. No. 17/835,358 filed on Jun. 8, 2022, entitled "LIDAR REFLECTIVE FABRIC," the entirety of which is incorporated by reference herein.

TECHNICAL FIELD

The present specification generally relates to particles that reflect near-IR electromagnetic radiation and, more specifically, to copper oxide particles integrated with textile materials that reflect near-IR electromagnetic radiation.

BACKGROUND

Light detecting and ranging (LiDAR) systems using pulsed laser electromagnetic radiation with a wavelength of 905 nanometers (nm) or 1050 nm, both of which are in the near infrared ("near-IR") portion of the electromagnetic spectrum, have been proposed and tested for autonomous vehicle obstacle detection and avoidance systems. Although reflection of near-IR electromagnetic radiation aids in the use of LiDAR, dark colored (e.g., black) items, such as fabrics, absorb not only visible electromagnetic radiation to provide the dark color, but also absorb near-IR electromagnetic radiation with a wavelength of greater than about 750 nanometers. As such, LiDAR-based obstacle detection and avoidance systems may perform unsatisfactorily as to dark colored items.

SUMMARY

Accordingly, a need exists for alternative dark colored items that absorb electromagnetic radiation within the visible spectrum, but that reflect near-IR electromagnetic radiation with wavelengths around 905 nm or 1050 nm.

A first aspect includes a composite material comprising: a black pigment; and a textile material, wherein the composite material has a reflectivity toward near infrared electromagnetic radiation having a wavelength from 800 nm to 2500 nm of greater than or equal to 12%, the composite material has a reflectivity toward visible light having a wavelength from 350 nm to 750 nm of less than or equal to 10%, and the composite material has a blackness ($M_y$) from 125 to 165.

A second aspect includes a composite material of the first aspect, wherein the black pigment comprises a compound selected from the group consisting of $CuO$, $TiO_2$, and a combination of two or more thereof.

A third aspect includes a composite material of any one of the first or second aspect, wherein the composite material has a reflectivity toward visible light having a wavelength from 350 nm to 750 nm of less than or equal to 5%.

A fourth aspect includes a composite material of any one of the first to third aspects, wherein the composite material has a reflectivity toward visible light having a wavelength from 350 nm to 750 nm of less than or equal to 1%.

A fifth aspect includes a composite material of any one of the first to fourth aspects, wherein the composite material has a reflectivity toward near infrared electromagnetic radiation having a wavelength from 800 nm to 2500 nm of greater than or equal to 15%.

A sixth aspect includes a composite material of any one of the first to fifth aspects, wherein the composite material has a reflectivity toward near infrared electromagnetic radiation having a wavelength from 800 nm to 2500 nm of greater than or equal to 20%.

A seventh aspect includes a composite material of any one of the first to sixth aspects, wherein the composite material has a blackness ($M_y$) from 130 to 165.

An eighth aspect includes a composite material of any one of the first to seventh aspects, wherein the black pigment is CuO having an average particle size of less than or equal to 5 microns.

A ninth aspect includes a composite material of any one of the first to eighth aspects, wherein the textile material is a synthetic polymeric composition.

A tenth aspect includes a composite material of any one of the first to ninth aspects, wherein the textile material is selected from the group consisting of polyamide, polyacrylonitrile, polyethylene terephthalate (PET), polybutyrate, polyurethane, nylon, polyester, and a combination of two or more thereof.

An eleventh aspect includes a composite material of any one of the first to tenth aspects, wherein the composite material has a color with a lightness in CIELAB color space L* less than or equal to 40.

A twelfth aspect includes a composite material of any one of the first to eleventh aspects, wherein the composite material has a color with a lightness in CIELAB color space L* less than or equal to 10.

A thirteenth aspect includes a composite material of any one of the first to twelfth aspects, wherein the composite material has a color with a lightness in CIELAB color space L* less than or equal to 1.

A fourteenth aspect includes a composite material comprising: CuO; and a textile material, wherein the CuO has an average particle size less than or equal to 5 microns the composite material has a color with a lightness in CIELAB color space L* less than or equal to 40.

A fifteenth aspect includes the composite material of the fourteenth aspect wherein the textile material is selected from the group consisting of polyamide, polyacrylonitrile, polyethylene terephthalate (PET), polybutyrate, polyurethane, nylon, polyester, and a combination of two or more thereof.

A sixteenth aspect includes the composite material of any one of the fourteenth or fifteenth aspects, wherein the composite material has a color with a lightness in CIELAB color space L* less than or equal to 10.

A seventeenth aspect includes a composite material of any one of the fourteenth to sixteenth aspects, wherein the composite material has a reflectivity toward near infrared electromagnetic radiation having a wavelength from 800 nm to 2500 nm of greater than or equal to 12%.

An eighteenth aspect includes a composite material of any one of the fourteenth to seventeenth aspects, wherein the composite material has a reflectivity toward visible light having a wavelength from 350 nm to 750 nm of less than or equal to 10%.

A nineteenth aspect includes a composite material of any one of the fourteenth to eighteenth aspects, wherein the composite material has a blackness ($M_y$) from 125 to 165.

A twentieth includes a method for making a black pigment-doped textile material, the method comprising: combining a black pigment with a textile material to form the black pigment-doped textile material, wherein the black pigment-doped textile material has a reflectivity toward near infrared electromagnetic radiation having a wavelength from 800 nm to 2500 nm of greater than or equal to 12%, the black pigment-doped textile material has a reflectivity toward visible light having a wavelength from 350 nm to 750 nm of less than or equal to 10%, and the black pigment-doped textile material has a blackness ($M_y$) from 125 to 165.

A twenty-first aspect includes the method of the twentieth aspect, further comprising extruding the black pigment-doped textile material, thereby producing the composite material fiber.

A twenty-second aspect includes the method of any one of the twentieth or twenty-first aspects, wherein the extruding comprises heating the black pigment-doped textile material mixture to a softening point of the textile material and drawing the black pigment-doped textile material mixture through a die.

A twenty-third aspect includes the method of any one of the twentieth to twenty-second aspects, wherein the extruding comprises heating the black pigment-doped textile material mixture to a melting point of the textile material and drawing the black pigment-doped textile material mixture through a die.

A twenty-fourth aspect includes the method of any one of the twentieth to twenty-third aspects, wherein the extruding comprises drawing the black pigment-doped textile material mixture through a spinneret, thereby producing filaments of the composite material fiber.

A twenty-fifth aspect includes the method of any one of the twentieth to twenty-fourth aspects, wherein the black pigment is CuO having an average particle size of less than or equal to 5 microns.

A twenty-sixth aspect includes the method of any one of the twenty-first to twenty-fifth aspects, wherein the composite material fiber has a color with a lightness in CIELAB color space L* less than or equal to 40.

A twenty-seventh aspect includes fabric comprising the composite material of any one of the first to thirteenth aspects.

A twenty-eighth aspect includes the fabric of the twenty-seventh aspect wherein the black pigment is CuO having an average particle size of less than or equal to 5 microns.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein are directed to LiDAR reflective dark-colored fabric. Such LiDAR reflective fabric may be formed from fibers made from textile polymers doped with a black pigment. The LiDAR reflective dark-colored fabric has a reflectivity toward near infrared electromagnetic radiation having a wavelength from 800 nm to 2500 nm of greater than or equal to 12% and a reflectivity toward visible light having a wavelength from 350 nm to 750 nm of less than or equal to 10%.

As used herein, the term "doped" means that a small amount of a substance (e.g. a black pigment; may be referred to as a "dopant" herein) has been added to another material (e.g., fibers made from textile polymers). In this context, the term "a small amount" refers to at most 5 wt % of the dopant by mass.

As used herein, the term "near-IR electromagnetic radiation" refers to electromagnetic radiation with wavelengths between and including 800 nm and 2500 nm, and "LiDAR" refers to electromagnetic radiation with wavelengths between and including 905 nm to 1550 nm.

As used herein, the term "visible spectrum" or "visible light" refers to electromagnetic radiation with wavelengths between and including 350 nm and 750 nm.

As used herein, the term "blackness" or "$M_y$," refers to an experimentally determined property of a material related to the material's ability to absorb light. The degree of blackness of the painted samples was evaluated by X-Rite Ci7600 benchtop spectrophotometer (USA, X-Rite) based on the reference provided (i.e. carbon black). It is based on the known formula, seen below, where My is measured under D65/10° conditions.

$$My = 100 \log(Yn/Y)$$

As used herein, the term "reflectivity" refers to a property of a material related to the material's ability to reflect electromagnetic radiation. Reflectivity is measured quantitatively from calibrated analysis of reflection data collected using a UV-visible light spectrometer.

As used herein, the term "particle size" refers to a value of at least one dimension of a particle, or when referring to a sample of more than one particle, an average value for the at least one dimension over the sample population of particles. Particle size is measured by scanning electron microscopy and transition electron microscopy.

As used herein, the term "CIELAB color space" is a color-opponent space with dimension L* for lightness and a* and b* for the color-opponent dimensions, based on nonlinearly compressed CIE space XYZ color space coordinates. The a* axis is perpendicular to the b* axis and forms the chromaticity plane, the L* axis is perpendicular to the chromaticity plane, and the L* axis in combination with the a* and b* axes provide a complete description of the color attributes of an object such as purity, hue and brightness. Using layman's terms, a highly colorful stimulus (color) is seen by the human eye as vivid and intense, while a less colorful stimulus appears more muted, closer to gray. With no "colorfulness" at all, a color is a "neutral" gray, and an image with no colorfulness is typically referred to as an image in grayscale or a grayscale image.

One difficulty in forming dark-colored (such as black) items that reflect LiDAR or near-IR electromagnetic radiation is the close proximity of the visible spectrum of electromagnetic radiation and near-IR electromagnetic radiation or LiDAR. Materials that provide a dark color, such as black, do not reflect electromagnetic radiation within the visible spectrum of electromagnetic radiation. Such materials will generally also not reflect electromagnetic radiation just outside of the visible spectrum of electromagnetic radiation, such as near-IR and LiDAR. Carbon black is one such material that is commonly used as a dark pigment and that does not reflect electromagnetic radiation in the visible spectrum and that also does not reflect near-IR or LiDAR electromagnetic radiation. Accordingly, a material that does not reflect electromagnetic radiation within the visible spectrum but that does reflect near-IR or LiDAR electromagnetic radiation is required to have a very sharp increase in reflectivity just outside of the visible spectrum of electromagnetic radiation.

Figure 1A:
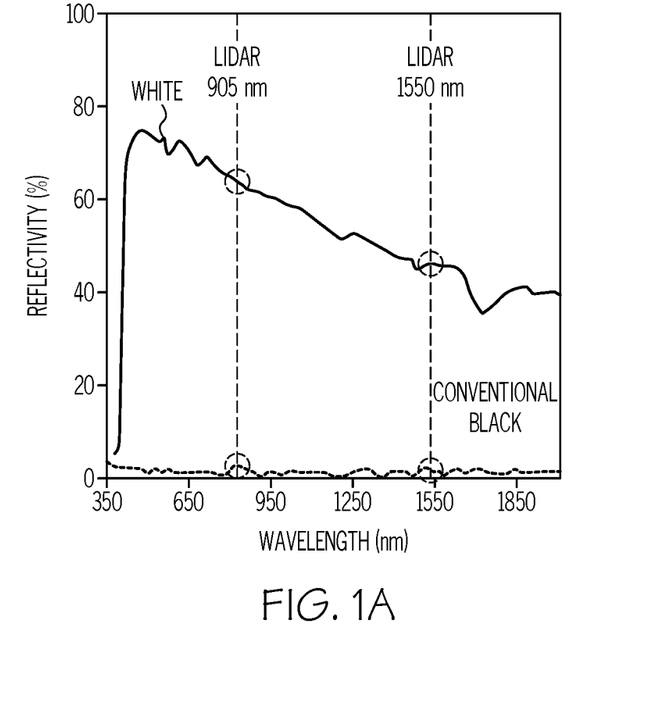
FIG. 1A graphically depicts the reflectivity versus wavelength of electromagnetic radiation for conventional colorants.

With reference now to FIG. 1A, the reflectivity of materials that are commonly used as colorants in a various items are shown. The percentage of ideal reflectivity is presented along the y-axis of FIG. 1A and the wavelength of the electromagnetic radiation is provided along the x-axis of FIG. 1A. The reflectivity of a conventional black colorant, such as carbon black, is shown along the bottom of the graph. As shown in FIG. 1A, the carbon black colorant does not reflect electromagnetic radiation in the visible spectrum (to the left of the graph). Namely, the reflection of this black colorant is near zero percent within the visible spectrum of electromagnetic radiation. This indicates that the colorant provides a dark, nearly pure black color. However, this conventional colorant also reflects around zero percent of electromagnetic radiation outside of the visible spectrum (to the right on the graph), such as near-IR electromagnetic radiation or LiDAR electromagnetic radiation (e.g., from greater than about 750 nanometers (nm) to about 1550 nm). Similarly, near the top of the graph is shown the reflectivity of white $TiO_2$, which is used as a conventional white colorant. As shown in FIG. 1A, white $TiO_2$ reflects near-IR and LiDAR electromagnetic radiation as shown on the right side of the graph (e.g., from greater than about 750 nm to 1550 nm) where the reflection of near-IR and LiDAR electromagnetic radiation is greater than forty percent (at 1550 nm), and around sixty percent (at 905 nm). However, white $TiO_2$, as the name indicates, also reflects electromagnetic radiation within the visible spectrum. As shown in FIG. 1A, white $TiO_2$ reflects nearly eighty percent of electromagnetic radiation within the visible spectrum. Accordingly, neither of these colorants—carbon black or white $TiO_2$—are suitable as a dark-colored particle that also reflects near-IR or LiDAR electromagnetic radiation.

Figure 1B:
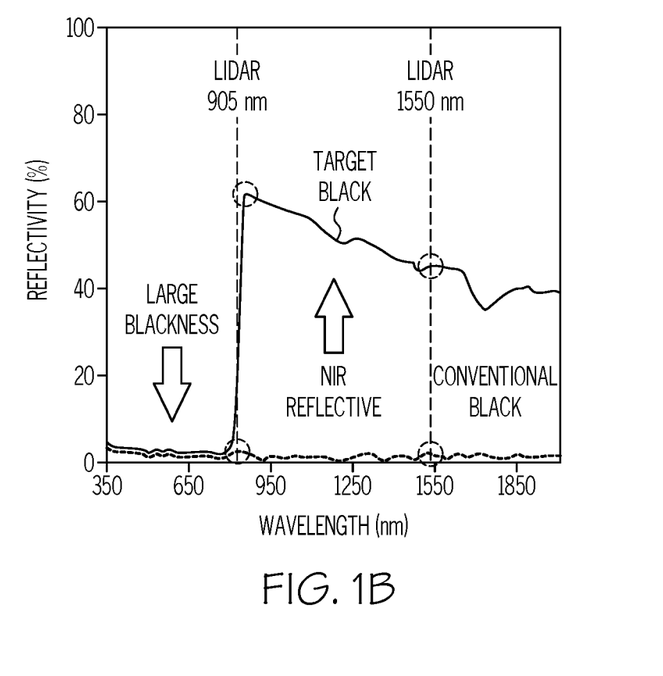
FIG. 1B graphically depicts the reflectivity versus wavelength of electromagnetic radiation for colorants according to embodiments disclosed and described herein.

FIG. 1B is a graph showing the target conditions of a particle that does not reflect light in the visible spectrum of electromagnetic radiation, but that does reflect near-IR and LiDAR electromagnetic radiation. In FIG. 1B, the percentage of reflectivity is measured along the y-axis and the wavelength of electromagnetic radiation is provided along the x-axis. Along the bottom of the graph is shown the reflectivity of a conventional black colorant, which is identical to the reflectivity of the conventional black colorant (such as carbon black) shown in FIG. 1A. As shown in FIG. 1B, particles that do not reflect electromagnetic radiation within the visible spectrum and that reflect near-IR and LiDAR electromagnetic radiation have at least two distinct regions of reflection. The first region of reflection is within the visible spectrum of electromagnetic radiation, indicated on the left side of the graph in FIG. 1B. In this region of reflection, particles that do not reflect electromagnetic radiation within the visible spectrum and that reflect near-IR and LiDAR electromagnetic radiation will behave the same as conventional black colorants (such as carbon black, as opposed to white $TiO_2$) by not reflecting electromagnetic radiation within the visible spectrum. As shown in FIG. 1B, particles that do not reflect electromagnetic radiation within the visible spectrum and that do reflect near-IR and LiDAR electromagnetic radiation. However, particles that do not reflect electromagnetic radiation within the visible spectrum and that do reflect near-IR and LiDAR electromagnetic radiation have a second region of reflection that is outside of the visible spectrum of electromagnetic radiation.

The second region of reflection encompasses electromagnetic radiation with wavelengths including and between 750 nm and 1550 nm (which includes near-IR and LiDAR electromagnetic radiation). In the second region of reflection, the particles that do not reflect electromagnetic radiation within the visible spectrum and that reflect near-IR and LiDAR electromagnetic radiation perform similarly to white $TiO_2$ (as opposed to carbon black), by reflecting a high amount of electromagnetic radiation within the second region of reflection. As shown in FIG. 1B, particles that do not reflect electromagnetic radiation within the visible spectrum and that reflect near-IR and LiDAR electromagnetic radiation reflect, for example, about sixty percent of LiDAR electromagnetic radiation having a wavelength of 905 nm and reflect greater than forty percent of LiDAR electromagnetic radiation having a wavelength of 1550 nm. By having reflectance in the second region of reflection that is similar to white $TiO_2$, particles can reflect a sufficient amount of near-IR and LiDAR electromagnetic radiation that the particles can be detected by LiDAR systems.

FIG. 1B shows the difficulty in forming particles that do not reflect electromagnetic radiation within the visible spectrum and that reflect near-IR and LiDAR electromagnetic radiation. Particularly, FIG. 1B shows a steep increase in reflectance just outside of the visible spectrum of electromagnetic radiation. In embodiments, this steep increase of reflectance is present at a wavelength of electromagnetic radiation that is at or about 905 nm, which is a wavelength of electromagnetic radiation commonly used in LiDAR systems. As shown in FIG. 1B, the reflectance increases from about zero percent to nearly sixty percent at a wavelength of electromagnetic radiation that is about 905 nm. Forming a particle with such a precise and steep increase in reflectance is difficult to achieve and there is very little room for error. For instance, if the material reflects too much electromagnetic radiation within the visible spectrum, the appearance of the color will not be pure black, but will have hints of, for example, red or purple. However, if the material does not reflect a sufficient amount of near-IR or LiDAR electromagnetic radiation, the material will not be suitable for detection by LiDAR systems.

Some materials do not reflect electromagnetic radiation within much of the visible spectrum and reflect near-IR and LiDAR electromagnetic radiation; however, these materials have not been able to reproduce the visible appearance of carbon black (i.e., having a reflectivity of about zero percent for electromagnetic radiation within the visible spectrum).

One way of determining this transition of low reflectivity in the visible spectrum of electromagnetic radiation to high reflectivity at near-IR and LiDAR electromagnetic radiation is by evaluating the band gap of a material. The band gap generally refers to the energy difference (in electron volts or eV) between the top of the valence band (VB) and the bottom of the conduction band (CB). The VB is the band of electron orbitals that electrons can jump out of, moving into the CB when excited. The VB is the outermost electron orbital of an atom that electrons can actually occupy. The band gap is the energy required for an electron to move from the VB to the CB and can be indicative of the electrical conductivity of the material. In optics, the band gap correlates to the threshold where photons can be absorbed by a material. Therefore, the band gap determines what portion of the electromagnetic spectrum the material can absorb. Generally, a material with a large band gap will absorb a greater portion of electromagnetic spectra having a short wavelength and a material with a small band gap will absorb a greater portion of electromagnetic spectra having long wavelengths. Put differently, a large band gap means that a lot of energy is required to excite valence electrons to the CB. In contrast, when the valence band and conduction band overlap as they do in metals, electrons can readily jump between the two bands, which means that the material is highly conductive. However, it has been found that by manipulating the band gap of a material, the types of electromagnetic spectra that are absorbed by the material may be controlled. In view of this, materials with bandgap energy near the LiDAR detection electromagnetic radiation wavelength (around 905 nm) or a band gap around 1.37 eV and sharp transition at the visible edge (around 700 nm) are promising candidates.

Figure 2:
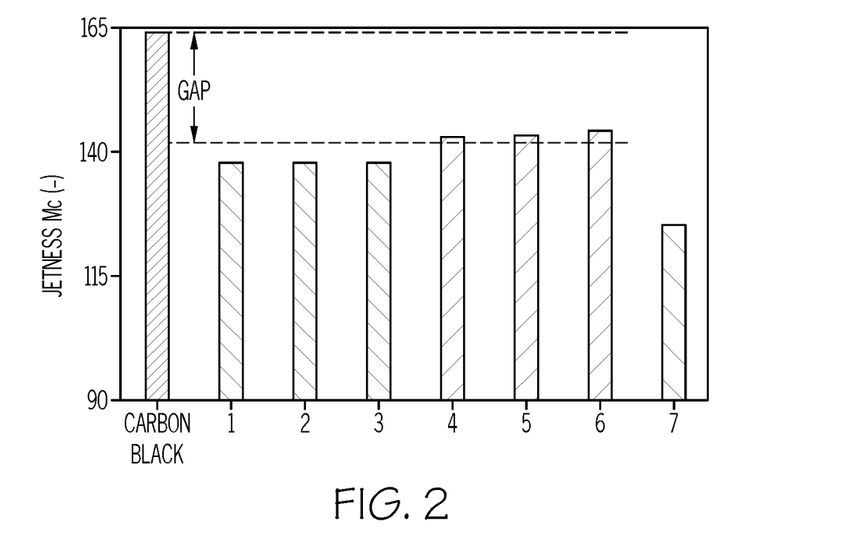
FIG. 2 is a bar graph depicting the blackness of commercially available materials.

In embodiments, the black pigment may include chromium iron oxide and derivatives thereof. Although chromium iron oxide materials can generally reflect near-IR and LiDAR electromagnetic radiation, colorants made from chromium iron oxide materials are generally referred to as "cool black" because colorants made from chromium iron oxide or derivatives thereof have hints of red or blue in them. FIG. 2 is a bar graph that shows the blackness of various materials on the y-axis. Blackness is measured by X-Rite Spectrophotometer. At the far left of FIG. 2 is carbon black, which is the material commonly used as a black colorant, but carbon black does not reflect near-IR or LiDAR electromagnetic radiation. As shown in FIG. 2, carbon black has a blackness of about 165. Materials 1-7 are chromium iron oxide-containing materials that reflect near-IR and LiDAR electromagnetic radiation, but as can be seen in FIG. 2, these materials have a blackness that is around 142 or less. This difference in blackness is notable, as materials 1-7 have tints of red or blue. Thus, this considerable gap in blackness between carbon black and materials 1-7 show that materials 1-7 are generally not suitable to be used in applications where pure black is desired, such as, for example, in paint for automotive applications or in black fabrics.

In embodiments, the black pigment includes copper (II) oxide or cupric oxide (CuO). CuO is a common inorganic compound that is a black-colored solid material in its natural state. However, not all copper oxides have this black color. Namely, another stable oxide of copper is cuprous oxide ($Cu_2O$) that is a red solid in its natural state. Without intending to be bound by any particular theory, it is believed that the oxidation state of the copper atom is one factor in the color of the compound. CuO is a product of copper mining and it is a precursor to many other copper-containing products and chemical compounds. CuO has been used as a black pigment in certain applications, such as in ceramics, glazes, and the like. However, CuO does not reflect near-IR or LiDAR electromagnetic radiation. That is, CuO in its natural state behaves much like carbon black in that it does not reflect electromagnetic radiation in the visible spectrum and it also does not reflect electromagnetic radiation in the near-IR or LiDAR spectrum. Without being bound to any particular theory, CuO has a band gap of 2.0 eV that and does not readily reflect electromagnetic radiation in the near-IR or LiDAR spectrum. When manipulating CuO to have a band gap that is more amenable to reflecting electromagnetic radiation in the near-IR or LiDAR spectrum, the color of the CuO degrades to a brownish black.

As noted above, items containing carbon black, exhibit very low reflection (less than 1%) throughout the visible and near-IR wavelength, resulting in high blackness value $M_y$. Paints with commercial CuO show a higher near-IR reflectivity selectively between wavelengths of electromagnetic radiation from 900 nm to 1000 nm, but CuO shows distinguishable reflection in visible wavelengths, particularly in red hue, resulting in an obvious brownish tone appearance with blackness value $M_y$ less than 130. On the other hand, "cool black" shows strong reflection in the deeper end of the near-IR spectra at electromagnetic radiation wavelengths greater than 905 nm yet does not sufficiently absorb in the visible wavelengths, with blackness value $M_y$ of 125.

Generally, a band gap of from 1.2 eV to 1.8 eV is required for a compound to absorb (i.e., not reflect) electromagnetic radiation in the visible spectrum and reflect electromagnetic radiation in the near-IR and LiDAR spectrum. Without manipulation, bulk CuO does not meet these requirements. Bulk CuO has a reported band gap of 2.0 eV and a blackness $M_y$ of 120. This band gap is outside of the 1.2 eV to 1.8 eV required to reflect electromagnetic radiation in the near-IR and LiDAR spectrum. Further, as noted above with reference to FIG. 2, a blackness $M_y$ of 120 is significantly lower than the blackness $M_y$ of carbon black. Accordingly, in embodiments disclosed and described herein, CuO crystallites have significantly reduced particle sizes, thereby resulting in a decrease the bandgap and an increase in the blackness $M_y$ of CuO.

Without being bound by any particular theory, it is believed that a sharp transition of reflectivity (or absorbance) between 700 nm wavelength and 905 nm wavelength electromagnetic radiation may be attributed to a near unity ratio of (−111)/(111) crystal facets and a crystal size around 100 Å for the (−111) plane. Such particles appear indistinguishable from carbon black and have the same degree of measured blackness, but these particles show 1500% better detectability by LiDAR than carbon black.

Methods for making CuO nanoparticles include mechanical methods, such as ball milling, jet milling, or combinations of the two. In embodiments, the CuO nanoparticles may be formed in accordance with the procedure disclosed in U.S. Provisional Application No. 63/208,783, entitled "Materials with High LiDAR Reflectivity," the entire content of which is incorporated herein. Briefly, the method includes combining a precipitating agent with a solution comprising copper nitrate to form a precipitate; drying the filtered precipitate, thereby obtaining dried precipitate; and sintering the dried precipitate to form copper oxide crystallites having an average particle size that is greater than or equal to 5 nm and less than or equal to 15 nm. The precipitating agent is selected from the group consisting of sodium hydroxide, sodium carbonate, ammonium carbonate, and combinations of two or more of these.

In embodiments, CuO crystallites that may be used as a replacement for carbon black and show superior blackness in the visible spectrum of electromagnetic radiation while also having high reflectivity in near-IR and LiDAR electromagnetic radiation wavelengths may be synthesized via a scalable precipitation-pyrolysis method—with proper selection in precipitating agents at certain concentration ranges—that is followed by a well-defined sintering process. Structural and chemical composition studies depict the evolution from precursor to extracted precipitates, and to final CuO crystallites at various process stages. As referenced above, two key indicators in XRD spectra may be used to guide the experimental conditions towards the desired crystal structure and resultant optical contrast in both visible and near-IR range.

In embodiment, the CuO crystallites may have an average particle size that is less than or equal to 5.0 µm, such as less than or equal to 4.5 µm, less than or equal to 4.0 µm, less than or equal to 3.5 µm, less than or equal to 3.0 µm, less than or equal to 2.5 µm, less than or equal to 2.0 µm, less than or equal to 1.5 µm, less than or equal to 1.0 µm, less than or equal to 0.5 µm. In such embodiments the CuO crystallites may have an average particle size that is from 0.5 µm to 5.0 µm, such as from 1.0 µm to 5.0 µm, from 1.5 µm to 5.0 µm, from 2.0 µm to 5.0 µm, from 2.5 µm to µm, from 3.0 µm to 5.0 µm, from 3.5 µm to 5.0 µm, from 4.0 µm to 5.0 µm, from 4.5 µm to µm, from 0.5 µm to 4.5 µm, from 1.0 µm to 4.5 µm, from 1.5 µm to 4.5 µm, from 2.0 µm to 4.5 µm, from 2.5 µm to 4.5 µm, from 3.0 µm to 4.5 µm, from 3.5 µm to 4.5 µm, from 4.0 µm to 4.5 µm, from 0.5 µm to 4.0 µm, from 1.0 µm to 4.0 µm, from 1.5 µm to 4.0 µm, from 2.0 µm to 4.0 µm, from 2.5 µm to 4.0 µm, from 3.0 µm to 4.0 µm, from 3.5 µm to 4.0 µm, from 0.5 µm to 3.5 µm, from 1.0 µm to 3.5 µm, from 1.5 µm to 3.5 µm, from 2.0 µm to 3.5 µm, from 2.5 µm to 3.5 µm, from 3.0 µm to 3.5 µm, from 0.5 µm to 3.0 µm, from 1.0 µm to 3.0 µm, from 1.5 µm to 3.0 µm, from 2.0 µm to 3.0 µm, from 2.5 µm to 3.0 µm, from 0.5 µm to 2.5 µm, from 1.0 µm to 2.5 µm, from 1.5 µm to 2.5 µm, from 2.0 µm to 2.5 µm, from 0.5 µm to 2.0 µm, from 1.0 µm to 2.0 µm, from 1.5 µm to 2.0 µm, from 0.5 µm to 1.5 µm, from 1.0 µm to 1.5 µm, or from 0.5 µm to 1.0 µm.

In one or more embodiments, the CuO crystallites may have an average particle size that is less than or equal to 50 nm, less than or equal to 45 nm, less than or equal to 40 nm, less than or equal to 35 nm, less than or equal to 30 nm, less than or equal to 25 nm, less than or equal to nm, less than or equal to 15 nm, or even less than or equal to 10 nm. For instance, the CuO crystallites may have an average particle size that is from 5 nm to 15 nm, such as from 6 nm to 15 nm, from 7 nm to 15 nm, from 8 nm to 15 nm, from 9 nm to 15 nm, from 10 nm to 15 nm, from 11 nm to 15 nm, from 12 nm to 15 nm, from 13 nm to 15 nm, from 14 nm to 15 nm, from 5 nm to 14 nm, from 6 nm to 14 nm, from 7 nm to 14 nm, from 8 nm to 14 nm, from 9 nm to 14 nm, from nm to 14 nm, from 11 nm to 14 nm, from 12 nm to 14 nm, from 13 nm to 14 nm, from 5 nm to 13 nm, from 6 nm to 13 nm, from 7 nm to 13 nm, from 8 nm to 13 nm, from 9 nm to 13 nm, from nm to 13 nm, from 11 nm to 13 nm, from 12 nm to 13 nm, from 5 nm to 12 nm, from 6 nm to 12 nm, from 7 nm to 12 nm, from 8 nm to 12 nm, from 9 nm to 12 nm, from 10 nm to 12 nm, from 11 nm to 12 nm, from 5 nm to 11 nm, from 6 nm to 11 nm, from 7 nm to 11 nm, from 8 nm to 11 nm, from 9 nm to 11 nm, from 10 nm to 11 nm, from 5 nm to 10 nm, from 6 nm to 10 nm, from 7 nm to 10 nm, from 8 nm to 10 nm, from 9 nm to 10 nm, from 5 nm to 9 nm, from 6 nm to 9 nm, from 7 nm to 9 nm, from 8 nm to 9 nm, from 5 nm to 8 nm, from 6 nm to 8 nm, from 7 nm to 8 nm, from 5 nm to 7 nm, from 6 nm to 7 nm, or from 5 nm to 6 nm.

Without being bound by any particular theory, it is believed that the smaller the average crystal size of the CuO nanoparticles, the lower the band gap of the CuO nanoparticles will be. Thus, by reducing bulk CuO particles to CuO nanoparticles according to embodiments disclosed and described herein, the band gap of the CuO nanoparticles is within the range that will reflect electromagnetic radiation within the near-IR and LiDAR spectrum. In embodiments, the band gap, as measured by X-ray photoelectron spectroscopy (XPS), of the CuO nanoparticles is from 1.2 eV to 1.8 eV, such as from 1.3 eV to 1.8 eV, from 1.4 eV to 1.8 eV, from 1.5 eV to 1.8 eV, from 1.6 eV to 1.8 eV, from 1.7 eV to 1.8 eV, is from 1.2 eV to 1.7 eV, such as from 1.3 eV to 1.7 eV, from 1.4 eV to 1.7 eV, from 1.5 eV to 1.7 eV, from 1.6 eV to 1.7 eV, from 1.2 eV to 1.6 eV, such as from 1.3 eV to 1.6 eV, from 1.4 eV to 1.6 eV, from 1.5 eV to 1.6 eV, from 1.2 eV to 1.5 eV, such as from 1.3 eV to 1.5 eV, from 1.4 eV to 1.5 eV, from 1.2 eV to 1.4 eV, such as from 1.3 eV to 1.4 eV, or from 1.2 eV to 1.3 eV.

In some embodiments, the black pigment may include the dark pigment disclosed in U.S. Pat. No. 11,118,062, the entire content of which is incorporated by reference herein. Briefly, the dark pigment includes a core layer formed from a reflecting material; a first layer extending across the core layer; a second layer extending across the first layer; and a third layer extending across the second layer. The first layer may be formed from a first absorber material or a first dielectric material and have a thickness from about 5 nm to about 500 nm. The second layer may be formed from a second absorber material different from the first absorber material and have a thickness from about 5 nm to about 50 nm. The third layer may be formed from a third absorber material or a second dielectric material, the third absorber material being different from the second absorber material, and the third layer has a thickness from about 5 nm to about 500 nm. The pigment reflects less than 10% of incident visible electromagnetic radiation for all incident angles of the visible electromagnetic radiation between and including 0° and 45°. The pigment reflects more than 60% of incident near-IR electromagnetic radiation with wavelengths between and including 850 nm and 950 nm for all incident angles of the near-IR electromagnetic radiation between and including 0° and 45°.

In embodiments, the black pigment may be the black $TiO_2$ disclosed in U.S. Pre-Grant Publication No. 2021/0139713, the entire content of which is incorporated herein by reference. Black $TiO_2$ has a blackness that is comparable to the blackness of carbon black. Further, black $TiO_2$ generally does not show tints of red and brown, and is a good substitute for carbon black. However, standard black $TiO_2$ does not reflect near-IR or LiDAR electromagnetic radiation. Moreover, black $TiO_2$ is more expensive to prepare than carbon black because $TiO_2$ naturally has a white color and must be treated, such as, for example, through hydrogenation, to form black $TiO_2$. White $TiO_2$ reflects near-IR and LiDAR electromagnetic radiation, but when it is treated to become black $TiO_2$ it loses its ability to reflect near-IR and LiDAR electromagnetic radiation. Accordingly, although black $TiO_2$ is visibly similar to carbon black in terms of its blackness, carbon black is generally preferred over black $TiO_2$ for these reasons and for economic reasons. However, white $TiO_2$ may be converted to black $TiO_2$ that does not reflect electromagnetic radiation within the visible spectrum and reflects near-IR and LiDAR electromagnetic radiation. In embodiments, the black $TiO_2$ has a crystalline titanium dioxide core and an amorphous titanium dioxide shell that encompasses the crystalline titanium dioxide core.

Regardless of which pigment is included in the composite material, the blackness $M_y$ (i.e., a measure of blackness) of the black pigment is, in embodiments, from 125 to 170, such as from 130 to 170, from 135 to 170, from 140 to 170, from 145 to 170, from 150 to 170, from 155 to 170, from 160 to 170, from 165 to 170, from 125 to 165, from 130 to 165, from 135 to 165, from 140 to 165, from 145 to 165, from 150 to 165, from 155 to 165, from 160 to 165, from 125 to 160, from 130 to 160, from 135 to 160, from 140 to 160, from 145 to 160, from 150 to 160, from 155 to 160, from 125 to 155, from 130 to 155, from 135 to 155, from 140 to 155, from 145 to 155, from 150 to 155, from 125 to 150, from 130 to 150, from 135 to 150, from 140 to 150, from 145 to 150, from 125 to 145, from 130 to 145, from 135 to 145, from 140 to 145, from 125 to 140, from 130 to 140, from 135 to 140, from 125 to 135, from 130 to 135, or from 125 to 130.

In embodiments, the black pigment may have a reflectivity in the visible spectrum of electromagnetic radiation (from 350 nm to 750 nm) that is less than or equal to 10%, such as less than or equal to 9%, less than or equal to 8%, less than or equal to 7%, less than or equal to 6%, less than or equal to 5%, less than or equal to 4%, less than or equal to 3%, less than or equal to 2%, less than or equal to 1%, or less than or equal to 0.5%.

In embodiments, the black pigment may have a reflectivity in the near-IR and LiDAR spectrum of electromagnetic radiation (from 800 nm to 2500 nm) that is greater than or equal to 10%, such as greater than or equal to 15%, greater than or equal to 20%, greater than or equal to 25%, greater than or equal to 30%, or greater than or equal to 35%, greater than or equal to 40%, greater than or equal to 45%, greater than or equal to 50%, greater than or equal to 55%, or greater than or equal to 60%.

The textile material of the composite material is not particularly limited and may refer to any polymer material used to form a synthetic fiber. Exemplary textile materials include, but are not limited to, polyamide, polyacrylonitrile, polyethylene terephthalate (PET), polybutyrate, polyurethane, nylon, polyester, and a combination of two or more thereof.

In embodiments, the fibers made from textile polymers may be doped with from 0.1% to 5.0% by mass of the black pigment, such as from 0.5% to 5.0% by mass of the black pigment, from 1.0% to 5.0% by mass of the black pigment, from 1.5% to 5.0% by mass of the black pigment, from 2.0% to 5.0% by mass of the black pigment, from 2.5% to 5.0% by mass of the black pigment, from 3.0% to 5.0% by mass of the black pigment, from 3.5% to 5.0% by mass of the black pigment, from 4.0% to 5.0% by mass of the black pigment, from 4.5% to 5.0% by mass of the black pigment, from 0.1% to 4.5% by mass of the black pigment, from 0.5% to 4.5% by mass of the black pigment, from 1.0% to 4.5% by mass of the black pigment, from 1.5% to 4.5% by mass of the black pigment, from 2.0% to 4.5% by mass of the black pigment, from 2.5% to 4.5% by mass of the black pigment, from 3.0% to 4.5% by mass of the black pigment, from 3.5% to 4.5% by mass of the black pigment, from 4.0% to 4.5% by mass of the black pigment, from 0.1% to 4.0% by mass of the black pigment, from 0.5% to 4.0% by mass of the black pigment, from 1.0% to 4.0% by mass of the black pigment, from 1.5% to 4.0% by mass of the black pigment, from 2.0% to 4.0% by mass of the black pigment, from 2.5% to 4.0% by mass of the black pigment, from 3.0% to 4.0% by mass of the black pigment, from 3.5% to 4.0% by mass of the black pigment, from 0.1% to 3.5% by mass of the black pigment, from 0.5% to 3.5% by mass of the black pigment, from 1.0% to 3.5% by mass of the black pigment, from 1.5% to 3.5% by mass of the black pigment, from 2.0% to 3.5% by mass of the black pigment, from 2.5% to 3.5% by mass of the black pigment, from 3.0% to 3.5% by mass of the black pigment, from 0.1% to 3.0% by mass of the black pigment, from 0.5% to 3.0% by mass of the black pigment, from 1.0% to 3.0% by mass of the black pigment, from 1.5% to 3.0% by mass of the black pigment, from 2.0% to 3.0% by mass of the black pigment, from 2.5% to 3.0% by mass of the black pigment, from 0.1% to 2.5% by mass of the black pigment, from 0.5% to 2.5% by mass of the black pigment, from 1.0% to 2.5% by mass of the black pigment, from 1.5% to 2.5% by mass of the black pigment, from 2.0% to 2.5% by mass of the black pigment, from 0.1% to 2.0% by mass of the black pigment, from 0.5% to 2.0% by mass of the black pigment, from 1.0% to 2.0% by mass of the black pigment, from 1.5% to 2.0% by mass of the black pigment, from 0.1% to 1.5% by mass of the black pigment, from 0.5% to 1.5% by mass of the black pigment, from 1.0% to 1.5% by mass of the black pigment, from 0.1% to 1.0% by mass of the black pigment, from 0.5% to 1.0% by mass of the black pigment, or from 0.1% to 0.5% by mass of the black pigment.

In some embodiments, the composite material may have a color with a lightness in CIELAB color space L* less than or equal to 40, less than or equal to 35, less than or equal to 30, less than or equal to 25, less than or equal to 20, less than or equal to 15, less than or equal to 10, less than or equal to 9, less than or equal to 8, less than or equal to 7, less than or equal to 6, less than or equal to 5, less than or equal to 4, less than or equal to 3, less than or equal to 2, or even less than or equal to 1.

Regardless of which pigment is included in the composite material, the blackness $M_y$ of the composite material is, in embodiments, from 125 to 165, such as from 130 to 165, from 135 to 165, from 140 to 165, from 145 to 165, from 150 to 165, from 155 to 165, from 160 to 165, from 125 to 160, from 130 to 160, from 135 to 160, from 140 to 160, from 145 to 160, from 150 to 160, from 155 to 160, from 125 to 155, from 130 to 155, from 135 to 155, from 140 to 155, from 145 to 155, from 150 to 155, from 125 to 150, from 130 to 150, from 135 to 150, from 140 to 150, from 145 to 150, from 125 to 145, from 130 to 145, from 135 to 145, from 140 to 145, from 125 to 140, from 130 to 140, from 135 to 140, from 125 to 135, from 130 to 135, or from 125 to 130.

In embodiments, the composite material may have a reflectivity in the visible spectrum of electromagnetic radiation (from 350 nm to 750 nm) that is less than or equal to 10%, such as less than or equal to 9%, less than or equal to 8%, less than or equal to 7%, less than or equal to 6%, less than or equal to 5%, less than or equal to 4%, less than or equal to 3%, less than or equal to 2%, less than or equal to 1%, or less than or equal to 0.5%.

In embodiments, the composite material may have a reflectivity in the near-IR and LiDAR spectrum of electromagnetic radiation (from 800 nm to 2500 nm) that is greater than or equal to 12%, such as greater than or equal to 15%, greater than or equal to 20%, greater than or equal to 25%, greater than or equal to 30%, or greater than or equal to 35%. In one or more embodiments, the composite material may have a reflectivity in the near-IR and LiDAR spectrum of electromagnetic radiation (from 800 nm to 2500 nm) that is greater than or equal to 12% and less than or equal to 30%, such as greater than or equal to 15% and less than or equal to 30%, greater than or equal to 20% and less than or equal to 30%, or greater than or equal to 25% and less than or equal to 30%, greater than or equal to 12% and less than or equal to 25%, greater than or equal to 15% and less than or equal to 25%, greater than or equal to 20% and less than or equal to 25%, greater than or equal to 12% and less than or equal to 20%, greater than or equal to 15% and less than or equal to 20%, or greater than or equal to 12% and less than or equal to 15%.

It should be understood that in one or more embodiments, the composite material may include a mixture of LiDAR-reflective black pigments (such as, for example, CuO and black $TiO_2$) and other commercially available black pigments (such as, for example, carbon black).

According to some embodiments, a method for making a composite material fiber is disclosed. Any of the black pigments described above may be combined with a textile material to form a black pigment-doped textile material mixture. In embodiments, combining the black pigment with the textile material may include softening and/or melting the textile material and mixing in the black pigment. In embodiments, combining the black pigment with the textile material includes dispersing the black pigment in a solvent and soaking an already-formed portion of the textile material. Exemplary solvents include water, methanol, ethanol, propanol, iso-propanol, pentane, hexane, and heptane.

In embodiments in which the textile material is softened and/or melted and then doped with the back pigment, the resulting black pigment-doped textile material mixture may then be extruded to produce the composite material fiber. In embodiments, the extruding may include heating the black pigment-doped textile material mixture to a softening point of the textile material and drawing the thus softened black pigment-doped textile material mixture through a die. In embodiments, the extruding may include heating the black pigment-doped textile material mixture to a melting point of the textile material and drawing the thus melted black pigment-doped textile material mixture through a die. In embodiments, the extruding may include drawing the black pigment-doped textile material mixture through a spinneret, thereby producing filaments of the composite material fiber.

In embodiments, the composite material fiber may be used to make thread or yarn which is woven, knitted, or otherwise threaded to form a LiDAR reflective black fabric. The LiDAR reflective black fabric may be used in a number of applications. One example application of the LiDAR reflective black fabric is incorporation into work clothes and uniforms for road construction, factory work, warehouse operation, or any other work setting with autonomous vehicles and other autonomous equipment that use LiDAR. Another example application of the LiDAR reflective black fabric is incorporation into exercise clothes, such as running gear. Still more examples can include outdoors wear like jackets, coats, parkas, ski pants and snow suits. Additional uses may be contemplated as the need for LiDAR reflective clothing will increase as autonomous vehicle become increasingly prevalent throughout society such as canopies for baby carriages or umbrellas.

EXAMPLES

Embodiments will be further clarified by the following examples.

Example 1—Synthesis

Analytic grade (AR) copper (II) nitrate $Cu(NO_3)_2$, sodium hydroxide (NaOH) and sodium carbonate $Na_2CO_3$ obtained from Sigma Aldrich, and deionized water are used without any further purification.

CuO nanoparticles are synthesized by a coprecipitation method using $Na_2CO_3$ or NaOH as precipitating agent. In a typical synthesis, the required amount of $Cu(NO_3)_2$ is dissolved in 300 ml distilled water. A known concentration of $Na_2CO_3$ or NaOH solution is added dropwise to the $Cu(NO_3)_2$ solution at room temperature with vigorous stirring. Then, the solution is stirred for 3 hours and aged overnight before filtration. After the overnight aging, the precipitate is filtered and washed with 1000 ml of distilled water. The solid products are then dried at 120° C. overnight and sintered from 300° C. to 600° C. for 3 hours with a 5° C./min ramp rate.

Crystallographic information of CuO nanoparticles is investigated using powder X-ray diffraction (XRD, Japan, Rigaku Miniflex 600) with Cu Kα radiation (λ=0.1541 nm). The average crystallite size τ of prepared particles is estimated from the measured width of their XRD diffraction curves using Scherrer's equation (1)

$$\tau = \frac{k\lambda}{\beta\cos\theta} \tag{1}$$

where k is a dimensionless shape factor with a value close to unity, λ represents the wavelength of the X-ray radiation, β is the line broadening at half the maximum intensity (FWHM), and θ is the Bragg's angle.

The CuO nanoparticles are then combined with a polymer material, and the mixture is heated to at least a softening point of the polymer material and extruded to produce filaments for forming composite fibers.

The thus obtained composite fibers are woven into a sheet of fabric of the composite fibers. Optical properties of the fabric are determined using UV/Vis/NIR spectrophotometers (USA Agilent Cary 7000). The bandgap calculation is based on the Kubelka-Munk function $F(R_\infty)$ which is related to the diffuse reflectance, $R_\infty$, of the sample by equation (2):

$$F(R_\infty)=(1-R_\infty)^2/2R_\infty \tag{2}$$

where $R_\infty$ is the absolute value of reflectance and $F(R_\infty)$ is equivalent to the absorption coefficient. The indirect bandgap of samples is estimated by plotting $(F(R_\infty)h\nu)^{0.5}$ versus energy. The linear part of the curve was extrapolated to $(F(R_\infty)h\nu)^{0.5}=0$ to obtain the indirect bandgap energy.

The degree of blackness $M_y$ of the fabric is evaluated by X-Rite Ci7600 benchtop spectrophotometer (USA, X-Rite) and is directly related to the reference provided by the instrument in accordance with equation (3):

$$M_y=100\log(Y_n/Y) \tag{3}$$

where $Y_n$=100,000 is one of the CIE White Point values for D65/10 conditions, and Y is one of the CIE tristimulus values for the sample being measured.

Comparative Example 1

Figure 3:
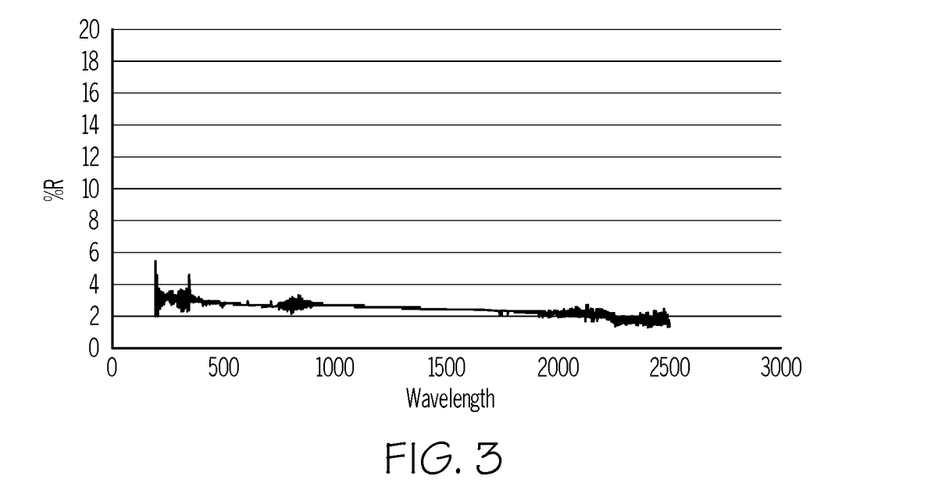
FIG. 3 is a graph depicting the reflectivity of commercially available black polyester.

The reflectivity of a commercially available black polyester (Instamorph Plastic manufactured by Sorfeo Inc.) was measured using a UV-visible light spectrometer. FIG. 3 is a graph showing the results of the reflectivity at wavelengths of electromagnetic radiation ranging from about 250 nm to about 2500 nm. As shown in FIG. 3, the reflectivity at electromagnetic radiation wavelengths greater than or equal to 910 nm is less than 3%.

Example 2

A commercially available white polyester (Instamorph Plastic manufactured by Sorfeo Inc.) was doped with an increasing mass percent of CuO nanoparticles synthesized in accordance with Example 1 above. Doping the polyester was conducted by heating the polyester to above 100° C. and then mechanically mixing in the CuO powder. The doped polyester was then allowed to cool back to room temperature. In particular, seven samples were prepared where the white polyester was doped with 0.10 mass % CuO nanoparticles, doped with 0.20 mass % CuO nanoparticles, doped with 0.50 mass % CuO nanoparticles, doped with 1.00 mass % CuO nanoparticles, doped with 2.00 mass % CuO nanoparticles, doped with 3.00 mass % CuO nanoparticles, and doped with 5.00 mass % CuO nanoparticles.

Figure 4A:
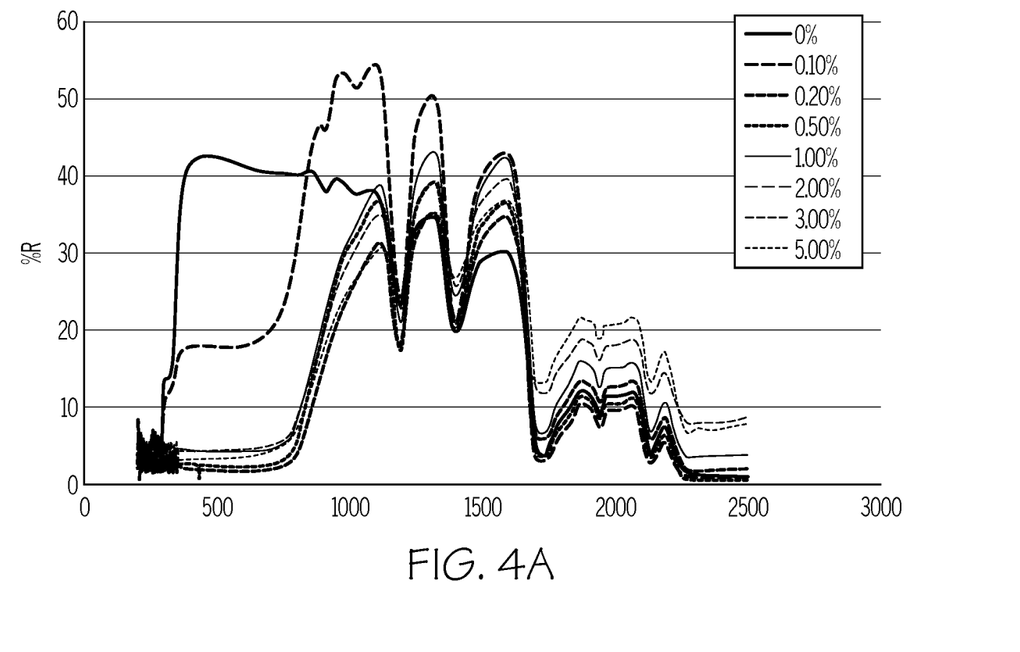
FIG. 4A is a graph depicting the reflectivity at electromagnetic radiation wavelengths from about 250 nm to about 2500 nm of polyester at different levels LiDAR-reflecting CuO nanoparticle doping.

FIG. 4A is a graph showing the reflectivity of these samples (as well as the undoped commercially available white polyester) at electromagnetic radiation wavelengths ranging from about 250 nm to about 2500 nm. As shown in FIG. 4A, at a CuO nanoparticle doping of 0.10 mass %, the reflectivity of the doped polyester in the visible electromagnetic radiation spectrum drops to below 20% (compared to about 40% for the undoped polyester) while the reflectivity of the doped polyester at electromagnetic radiation wavelengths from about 900 nm to about 1600 nm is above 40% and reflectivity at electromagnetic radiation wavelengths from about 1600 nm to about 2200 nm is near 20%. Moreover, at CuO nanoparticle doping of 0.20 mass % or more, the reflectivity of the doped polyester in the visible electromagnetic radiation spectrum drops to below 10% (to about 5%) while the reflectivity of the doped polyester at electromagnetic radiation wavelengths from about 900 nm to about 1600 nm is from about 20% to above 40%, and reflectivity at electromagnetic radiation wavelengths from about 1600 nm to about 2200 nm is above 10% for many samples.

Figure 4B:
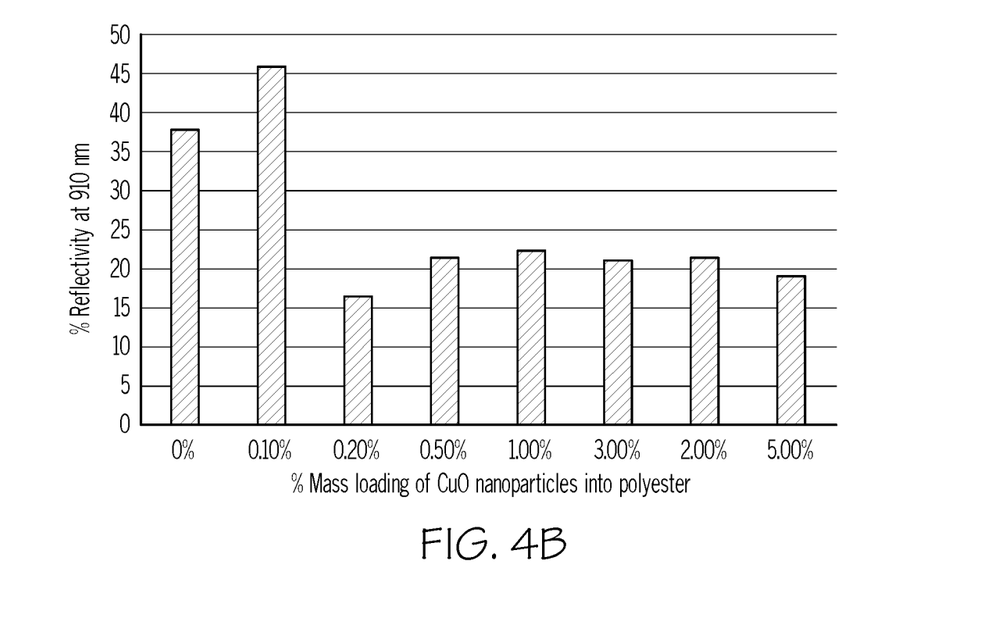
FIG. 4B is a bar graph depicting the reflectivity at an electromagnetic radiation wavelength of 910 nm of polyester with different levels of LiDAR-reflecting CuO nanoparticle doping.

FIG. 4B is a bar graph showing the reflectivity of the samples at an electromagnetic radiation wavelength of 910 nm. As shown in FIG. 4B, the reflectivity is very high for the undoped polyester and the polyester doped with 0.10 mass % CuO nanoparticles, but these samples reflect a significant amount of electromagnetic radiation wavelengths in the visible spectrum. However, polyester samples doped with 0.20 mass % or greater reflect more than 15% of electromagnetic radiation at a wavelength of 900 nm and reflect a small amount of electromagnetic radiation wavelengths in the visible spectrum.

Example 3

A commercially available white polyester (Instamorph Plastic manufactured by Sorfeo Inc.) was doped with 0.5 mass % of CuO nanoparticles synthesized in accordance with Example 1 above. Doping the polyester was conducted by heating the polyester to above 100° C. and then mechanically mixing in the CuO powder. The polyester was then allowed to cool back to room temperature. To this polyester, an increasing mass percent of carbon black (Carbon Black manufactured by Pearl Ex) was added. In particular, five samples were prepared where the polyester doped with 0.5 mass % CuO nanoparticles was doped with 0.20 mass % carbon black, doped with 0.40 mass % carbon black, doped with 0.60 mass % carbon black, doped with 0.80 mass % carbon black, and doped with 1.00 mass % carbon black.

Figure 5A:
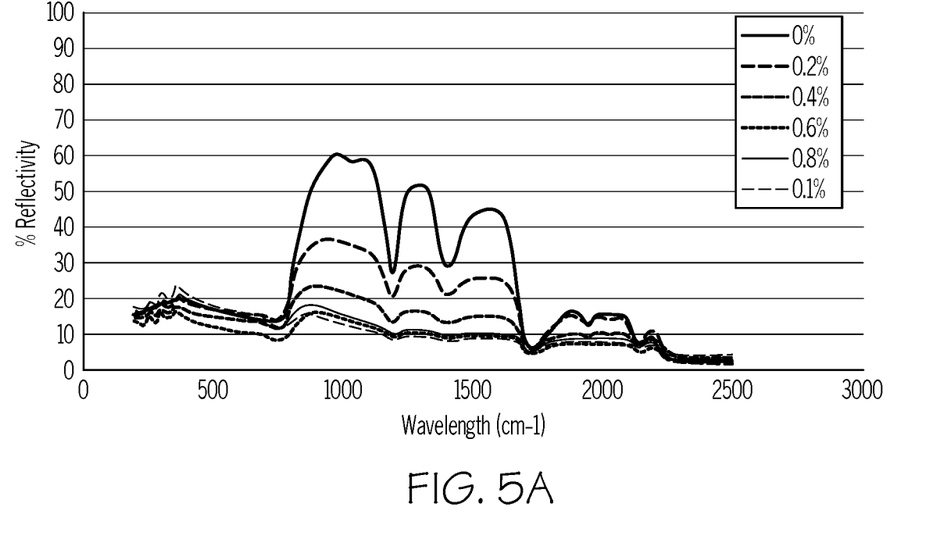
FIG. 5A is a graph depicting the reflectivity at electromagnetic radiation wavelengths from about 250 nm to about 2500 nm of polyester doped with 0.5 mass % LiDAR-reflecting CuO nanoparticles at different levels of carbon black doping.

FIG. 5A is a graph showing the reflectivity of these samples (as well as the commercially available white polyester doped with 0.5 mass % CuO nanoparticles) at electromagnetic radiation wavelengths ranging from about 250 nm to about 2500 nm. As shown in FIG. 5A, all the samples had similar reflectivity at electromagnetic radiation wavelengths in the visible spectrum, but the reflectivity of the polyester at electromagnetic radiation wavelengths from about 900 nm to about 1600 nm decreased as carbon black was added to the polyester, with a significant decrease between the 0.20 mass % doping and the 0.40 mass % doping. The samples doped with more than 0.40 mass % carbon black had very similar reflectivity at electromagnetic radiation wavelengths from about 900 nm to about 1600 nm.

Figure 5B:
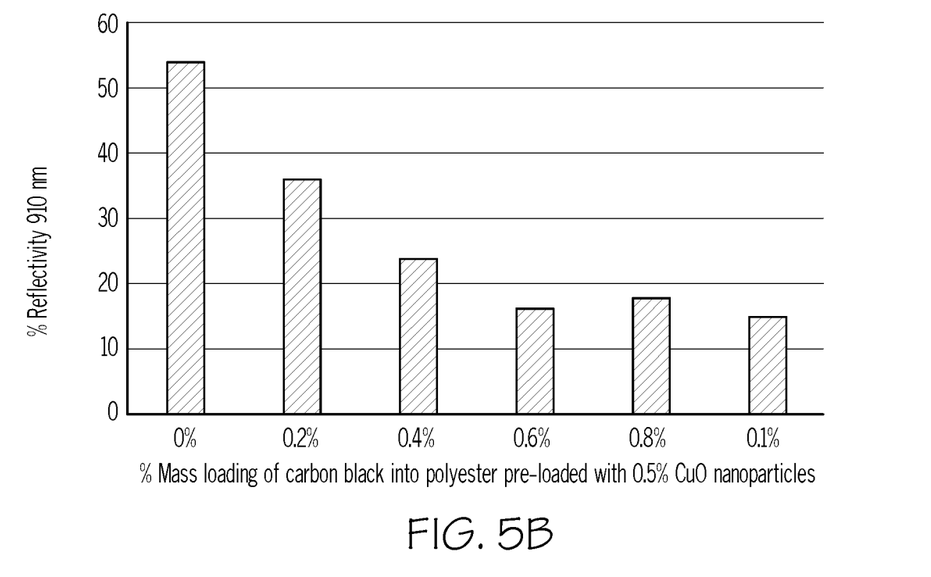
FIG. 5B is a bar graph depicting the reflectivity at an electromagnetic radiation wavelength of 910 nm of polyester doped with 0.5 mass % LiDAR-reflecting CuO nanoparticles at different levels of carbon black doping.

FIG. 5B is a bar graph showing the reflectivity of the samples at an electromagnetic radiation wavelength of 910 nm. As shown in FIG. 5B, the reflectivity is very high for the polyester doped with 0.5 mass % CuO nanoparticles and no carbon black. However, the reflectivity at an electromagnetic radiation wavelength of 910 nm decreased as carbon black was added to the polyester. The reflectivity at an electromagnetic radiation wavelength of 910 nm leveled off below 20% after 0.6 mass % carbon black loading.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A composite material comprising:
   a black pigment; and
   a textile material, wherein
   the black pigment comprises CuO comprising a near unity ratio of (−111)/(111) crystal facets and a crystal size around 100 Å for the (−111) plane,
   the composite material has a reflectivity toward a band of near infrared electromagnetic radiation within a wavelength from 800 nm to 2500 nm of greater than or equal to 12%, and
   the composite material has a reflectivity toward visible light having a wavelength from 350 nm to 750 nm of less than or equal to 10%.

2. The composite material of claim 1, wherein the black pigment comprises a compound selected from the group consisting of CuO, $TiO_2$, and a combination thereof.

3. The composite material of claim 1, wherein the composite material has a reflectivity toward visible light having a wavelength from 350 nm to 750 nm of less than or equal to 5%.

4. The composite material of claim 1, wherein the composite material has a reflectivity toward a band of near infrared electromagnetic radiation within a wavelength from 800 nm to 2500 nm of greater than or equal to 20%.

5. The composite material of claim 1, wherein the black pigment is CuO having an average particle size of less than or equal to 5 microns.

6. The composite material of claim 1, wherein the textile material is selected from the group consisting of polyamide, polyacrylonitrile, polyethylene terephthalate (PET), polybutyrate, polyurethane, nylon, polyester, and a combination of two or more thereof.

7. The composite material of claim 1, wherein the composite material has a color with a lightness in CIELAB color space L* less than or equal to 40.

8. A fabric comprising the composite material of claim 1.

9. A composite material comprising:
   CuO; and
   a textile material, wherein the CuO has an average particle size less than or equal to 5 microns;

the CuO comprises a near unity ratio of (−111)/(111) crystal facets and a crystal size around 100 Å for the (−111) plane; and the composite material has a color with a lightness in CIELAB color space L* less than or equal to 40.

10. The composite material of claim 9, wherein the textile material is selected from the group consisting of polyamide, polyacrylonitrile, polyethylene terephthalate (PET), polybutyrate, polyurethane, nylon, polyester, and a combination of two or more thereof.

11. The composite material of claim 9, wherein the composite material has a color with a lightness in CIELAB color space L* less than or equal to 10.

12. The composite material of claim 9, wherein the composite material has a reflectivity toward a band of near infrared electromagnetic radiation within a wavelength from 800 nm to 2500 nm of greater than or equal to 12%.

13. The composite material of claim 9, wherein the composite material has a reflectivity toward visible light having a wavelength from 350 nm to 750 nm of less than or equal to 10%.

14. The composite material of claim 9, wherein the composite material has a blackness ($M_y$) from 125 to 165.

15. A method for making a black pigment-doped textile material, the method comprising:

combining a black pigment with a textile material to form the black pigment-doped textile material, and extruding the black pigment-doped textile material, thereby producing a composite material fiber, wherein the black pigment comprises CuO comprising a near unity ratio of (−111)/(111) crystal facets and a crystal size around 100 Å for the (−111) plane, the black pigment-doped textile material has a reflectivity toward a band of near infrared electromagnetic radiation within a wavelength from 800 nm to 2500 nm of greater than or equal to 12%, and the black pigment-doped textile material has a reflectivity toward visible light having a wavelength from 350 nm to 750 nm of less than or equal to 10%.

16. The method of claim 15, wherein the extruding comprises heating the black pigment-doped textile material to a softening point of the textile material and drawing the black pigment-doped textile material through a die.

17. The method of claim 15, wherein the extruding comprises heating the black pigment-doped textile material to a melting point of the textile material and drawing the black pigment-doped textile material through a die.

18. The method of claim 15, wherein the extruding comprises drawing the black pigment-doped textile material through a spinneret, thereby producing filaments of the composite material fiber.

19. The method of claim 15, wherein the black pigment is CuO having an average particle size of less than or equal to 5 microns.

* * * * *

UNITED STATES PATENT AND TRADEMARK OFFICE
CERTIFICATE OF CORRECTION

PATENT NO. : 12,169,294 B2
APPLICATION NO. : 18/136084
DATED : December 17, 2024
INVENTOR(S) : Michael P. Rowe et al.

Page 1 of 1

It is certified that error appears in the above-identified patent and that said Letters Patent is hereby corrected as shown below:

On the Title Page

Item (73), assignee 2, city, delete "Toyota (JP)" and insert --Toyota-shi Aichi-ken (JP)--, therefor.

In the Specification

In Column 1, Line(s) 54, delete "aspect" and insert --aspects--, therefor.

In Column 2, Line(s) 60, after "twentieth", insert --aspect--.

In Column 9, Line(s) 27, after "from 2.5 μm to", insert --5.0--.

In Column 9, Line(s) 29, after "from 4.5 μm to", insert --5.0--.

In Column 9, Line(s) 48, after "less than or equal to", insert --20--.

In Column 9, Line(s) 56, after "9 nm to 14nm, from", insert --10--.

In Column 9, Line(s) 60, delete "from nm" and insert --from 10 nm--, therefor.

In Column 13, Line(s) 27, delete "back" and insert --black--, therefor.

In Column 13, Line(s) 53, delete "vehicle" and insert --vehicles--, therefor.

Signed and Sealed this
Eighteenth Day of February, 2025

Coke Morgan Stewart
*Acting Director of the United States Patent and Trademark Office*